United States Patent [19]

Yamaguchi et al.

[11] Patent Number: 4,540,335
[45] Date of Patent: Sep. 10, 1985

[54] CONTROLLABLE-PITCH MOVING BLADE TYPE AXIAL FAN

[75] Inventors: Nobuyuki Yamaguchi, Takasago; Hiroshi Sugano, Nagasaki, both of Japan

[73] Assignee: Mitsubishi Jukogyo Kabushiki Kaisha, Tokyo, Japan

[21] Appl. No.: 322,550

[22] Filed: Nov. 18, 1981

[30] Foreign Application Priority Data

Dec. 2, 1980 [JP] Japan .................. 55-172122

[51] Int. Cl.$^3$ .............................. F01D 7/00
[52] U.S. Cl. .................... 415/129; 415/145; 415/DIG. 1
[58] Field of Search ............ 415/129, 130, 174, 168, 415/121 A, 144, 52, 53 R, 110, 115, 145, 116, DIG. 1; 60/226.1, 39.091

[56] References Cited

U.S. PATENT DOCUMENTS

| | | | |
|---|---|---|---|
| 1,903,823 | 4/1933 | Lougheed | 415/174 |
| 2,361,887 | 10/1944 | Traupel | 415/130 X |
| 2,382,535 | 8/1945 | Bauer | 415/129 |
| 2,685,429 | 8/1954 | Auyer | 415/110 |
| 2,698,129 | 12/1954 | Troller et al. | 415/129 |
| 2,720,356 | 10/1955 | Erwin | 415/174 |
| 2,925,711 | 2/1960 | Townsend | 60/39.091 X |
| 2,963,268 | 12/1960 | Smile et al. | 415/110 |
| 3,365,172 | 1/1968 | McDonough et al. | 415/174 |
| 3,846,038 | 11/1974 | Carriere et al. | 415/145 X |
| 3,970,319 | 7/1976 | Carroll et al. | 415/174 X |
| 4,086,022 | 4/1978 | Freeman et al. | 415/144 X |
| 4,155,680 | 5/1979 | Linko, III et al. | 60/39.091 X |
| 4,155,681 | 5/1979 | Linko, III et al. | 60/39.091 X |
| 4,157,880 | 6/1979 | Klompas | 415/168 X |
| 4,239,452 | 12/1980 | Roberts, Jr. | 60/226.1 X |

FOREIGN PATENT DOCUMENTS

| | | | |
|---|---|---|---|
| 938534 | 10/1963 | United Kingdom | 415/145 |
| 1462271 | 1/1977 | United Kingdom | 415/244 |
| 1490923 | 11/1977 | United Kingdom | 415/244 |
| 2090334 | 7/1980 | United Kingdom | 415/119 |

Primary Examiner—Philip R. Coe
Assistant Examiner—Frankie L. Stinson
Attorney, Agent, or Firm—Toren, McGeady, Stanger, Goldberg & Kiel

[57] ABSTRACT

An axial fan of the controllable-pitch moving blade type, equipped with a controllable-pitch moving blade mechanism capable of changing the setting angle of the blades during operation, includes a casing treatment embedded in the inner wall of the casing facing the tips of moving blades and along the circumference of the tip circle.

8 Claims, 29 Drawing Figures

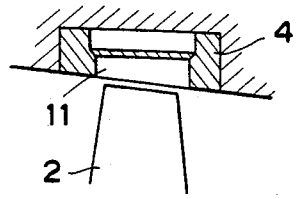
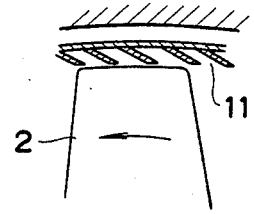
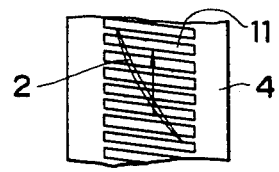
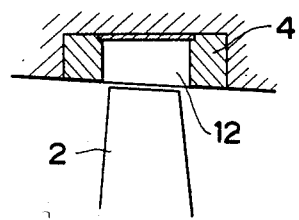
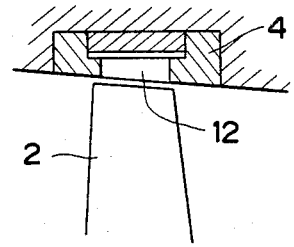
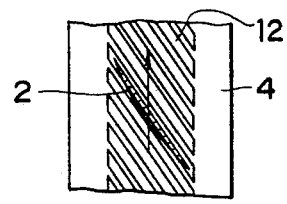
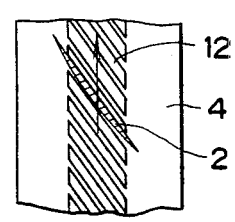

FIG. 11
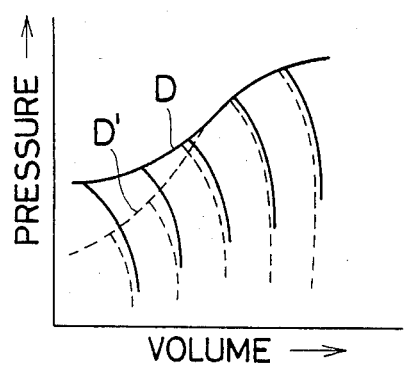
FIG. 13a
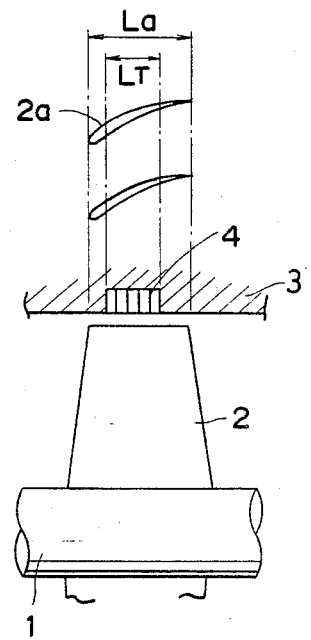
FIG. 13b
FIG. 12a
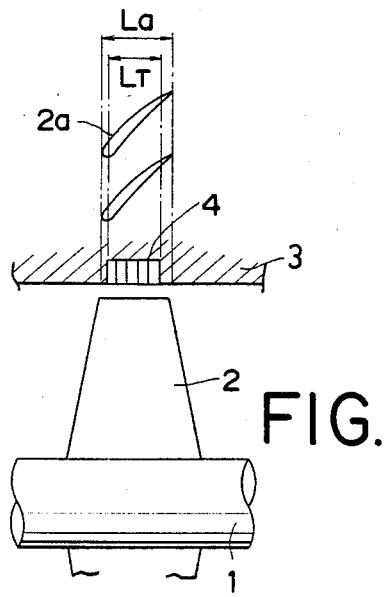
FIG. 12b

CONTROLLABLE-PITCH MOVING BLADE TYPE AXIAL FAN

This invention relates to improvements in a controllable-pitch moving blade type axial fan in which the fan rotor hub has a built-in control mechanism for changing the setting angle of the rotor blades during operation.

Generally, adoption of a controllable-pitch moving blade or pitch-changing system enables an axial fan characteristically to deliver air volumes over extended ranges, without substantially sacrificing the pressure even at low volume delivery.

In FIG. 1, curve "a" is a characteristic curve of a fan with a moving blade pitch-angle of a given value. "b" is corresponding to another angle of blades. "c"–"f" are corresponding to respective blade angles. "a" is for a low pitch angle of moving blades. "f" is for a high pitch-angle of moving blades.

As indicated by characteristic curves in FIG. 1, the axial fan can work on an intermediate operating line B as well as, of course, an operating line A of the constant resistance type. The operating line of the curve B is established only by the fan of the controllable-pitch moving blade type, and it makes possible the attainment of excellent working efficiency over the entire range of operating conditions for the plant in which the fan is installed.

Recently, however, there has been a growing number of applications which require also an operating line close to the hydrostatic, such as the line C. For example, boiler plants include coal pulverizers, and sometimes a single fan serves a plurality of coal pulverizers. In that case, the air volume to be delivered is changed by increasing or decreasing the number of pulverizers in operation. The volume per pulverizer is not to change at all, and therefore the pressure loss per pulverizer remains unchanged. In other words, the fan is desired to exhibit an operating line such as C, along which the pressure requirement is unchanged despite changes in the volume flow rate. Attainment of such an operating line as C is a stringent requirement for any type of fan and is a condition difficult for the controllable-pitch moving blade type, too. If, as shown in FIG. 2, a minimum surge margin ΔP is specified at the point where the surge pressure is at the lowest level, than the high flow side of the operating line C, if seen along the iso-efficiency curve E, will be away from the peak efficiency region E', with a consequent lowering in efficiency.

The present invention is aimed at providing an axial fan of the controllable-pitch moving blade type which solves the foregoing problems of the prior art and permits the operating conditions that require high pressures in the low flow rate region to be secured efficiently and safely.

In accordance with the invention, an axial fan of the controllable-pitch moving blade type is provided which is equipped with a controllable-pitch moving blade mechanism capable of changing the setting angle of the blades during operation and which further comprises a casing treatment provided in the inner wall of the casing along the circumference of the tip circle of the blades inside.

The term "casing treatment" as used herein for the axial fan implies an annular member, of a perforated, honeycombed, or circumferentially, axially, a diagonally slitted structure, embedded in an annular groove or recess formed in the inner wall of the casing opposite to, and along, the circumference of the tip circle of the blades inside the casing, so that the stall of the blades may be delayed by the aerodynamic interferences between the flows around the blades and those flows in the treated cavity which develop when the treated casing treatment is swept out by the blade tips.

Casing treatments for turbomachines have been known in the art from prior publications, e.g., U.S. Pat. No. 2,963,307, British Pat. No. 793,886, and U.S. Pat. No. 3,580,692.

In practice, the casing treatments have hitherto been intended for incorporation into variable-speed axial fans and compressors (sometimes in combination with a stator blade control system). The present invention, by contrast, is characterized by the adoption of a casing treatment into an axial fan of the controllable-pitch moving blade type.

The controllable-pitch moving blade type axial fan, with the casing treatment incorporated in accordance with the invention, exhibits an improvement in stall characteristics at low volume flow rate, as indicated by the broken line S in FIG. 2, with an expansion of the surge margin to ΔP'.

Now if the surge margin is set to a minimum ΔP as already mentioned, the operating line C will rise to C' and the high flow side of the line C' will approach the peak efficiency region E', establishing a desirable condition for a near-hydrostatic operating line.

Other objects, features, and advantages of the invention will become apparent from the following description taken in conjunction with the accompanying drawings, wherein:

FIGS. 4 to 10 show various forms of casing treatment to be used in accordance with the invention, in longitudinal sections (a), plans (b), and a transverse section (c);

FIG. 11 is a graph comparing the characteristics of a controllable-pitch moving blade type axial fan of the invention with those of a conventional one;

FIGS. 12 and 13 are explanatory of the operation of the fan according to the invention, (a) in both figures being front views of the blade tip and (b), side views of the rotor blade;

Figure 16:
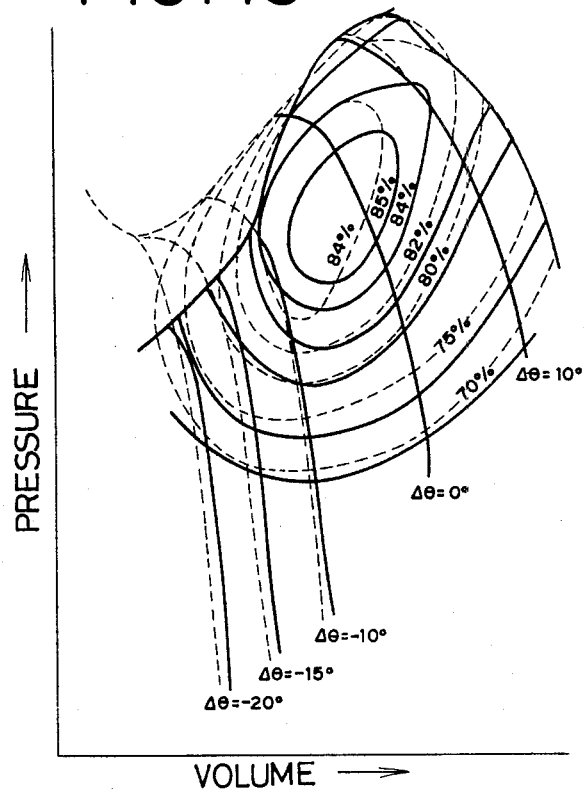
Figure 15:
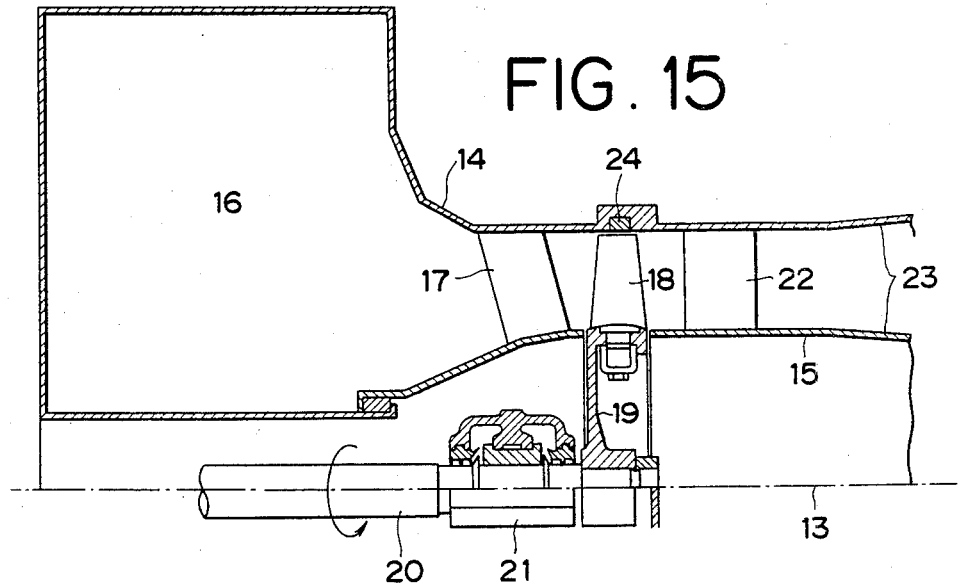

FIGS. 14 (a), (b), and (c) are fragmentary views of the rotor blade at different setting angle with respect to the casing treatment;

FIG. 15 is a vertical sectional view of the essential parts of an axial fan used for tests under the invention;

FIG. 16 is a graph in which the characteristics determined by the tests are plotted.

Figure 17:
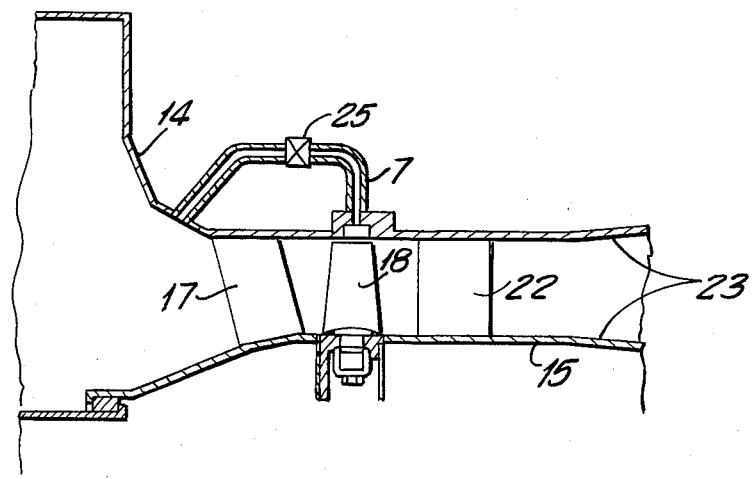

FIG. 17 is a vertical sectional view similar to FIG. 15 of one embodiment of the invention.

Figure 3:
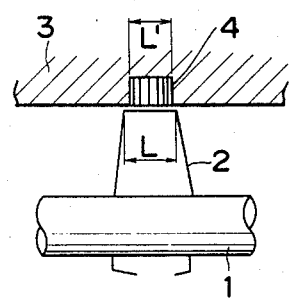
FIG. 3 is a fragmentary sectional view of essential parts of an axial fan embodying the invention.

Referring now to FIG. 3, there are shown a fan rotor hub 1, and one of rotor blades 2 supported at roots by a blade control mechanism built in the hub 1, in such a manner that the setting angle of the blades 2 can be changed at any time during operation. The control mechanism per se is of a conventional design and the explanation and the drawings are omitted. The surrounding wall of a casing 3 has an annular groove or recess formed facing the blade tips, and along, the circumference of the tip circle, and a casing treatment 4 is embedded in the annular recess, partly exposed flush with the inner wall surface.

For the purposes of the invention the expression "casing treatment" is used to denote an annular member having a width L' slightly greater or smaller than the axial width L of the tip section of each blade 2 and which is embedded in the casing wall 3 to surround the rotating blades. It is formed with slits or grids or perforations at least on the exposed surface.

The casing treatment 4 may take various structures as shown, for example, in FIGS. 4 through 10. It may comprise a face plate 6 with a number of perforations 5 and be communicated on the back side with a duct 7 extending upstream or downstream of the air passage (FIG. 4), or may have a honeycomb with cells 8 (FIG. 5), some circumferential grooves or slits 9 (FIG. 6), a multiplicity of axial slits 10 with a duct 7 communicated on the rear side (FIG. 7), a number of slits 11 slanted with a certain inclination to the pitch angle of the rotor blades (FIG. 8), or a number of slits 12 slanted in the same direction as the blade pitch angle (FIGS. 9 and 10).

The casing treatment originated from certain experiments for air extraction at the tip of the moving blades as means for preventing the stall of the blade. Therefore, the casing treatment can be considered for use in combination with a means which remove a part of air flow at the tip end from the ducts which are provided in the back side of said treatment. Numeral 7 in FIG. 4 and numeral 7' in FIG. 7 are shown as examples thereof.

Figure 4A:
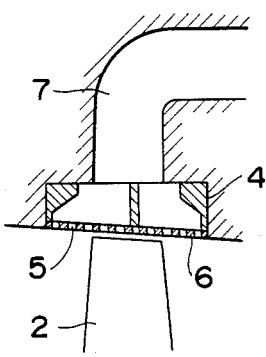
Figure 4B:
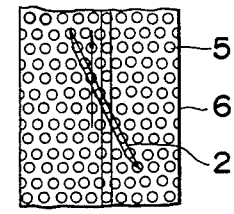
Figure 5A:
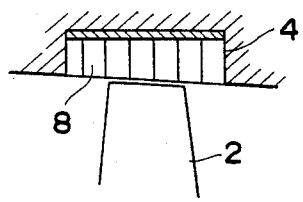
Figure 6A:
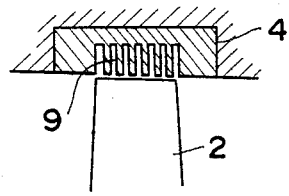
Figure 5B:
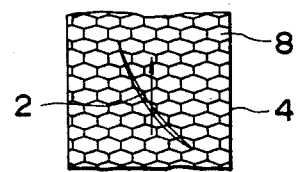
Figure 6B:
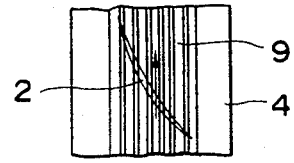
Figure 7A:
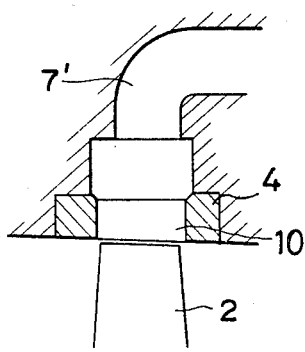
Figure 7B:
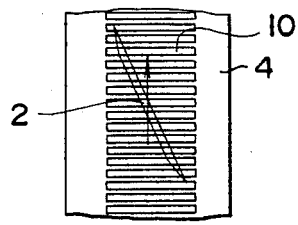

The duct 7 in FIG. 4 and the duct 7' in FIG. 7 are so designed as to remove part of air flow at the tip of the moving blades therethrough, and these structures serve to better enhance the effect of the casing treatment. In FIG. 17 the duct 7, as in FIG. 4, is connected to the low pressure portion of the axial fan between the outer casing 14 and the inner casing 15, that is, downstream of the rotor blade 18. Alternatively, the duct could be connected to the outer casing upstream of the rotor blade.

FIG. 11 shows the volume-pressure characteristics of a controllable-pitch moving blade type axial fan provided with such a casing treatment 4 and of a conventional, untreated axial fan of the type.

In FIG. 11, the full lines represent the characteristics of the axial fan embodying the invention and the broken lines represent those of the ordinary fan. As will be appreciated from the graph, the surge line D of the axial fan according to the invention indicates that the pressure is the same, on the high flow side, as that represented by the surge line D' of the conventional axial fan but is much higher than the latter on the low flow side.

Generally, the adoption of a casing treatment for an axial fan with fixed-pitch moving blades is known to put off or extend the stall point. This is applicable to fans of any design-flow rate, but it has not been possible to put off the stall line whether it is of speed-control type or of controllable stator blade type. Under the invention, incorporation of a casing treatment permits very desirable improvements in the characteristics of a controllable-pitch moving blade type axial fan.

The improvements are ascribable to the fact that, whereas the width of the casing treatment 4 remains constant, the corresponding axial width of the tip section of each rotor blade 2 varies with whether the air flow rate to be handled is small or large in the case of controllable-pitch moving blade fan.

FIG. 12 illustrates a rotor blade and associated parts during operation at low flow rate, in an expanded upper view of the blade tip (a) and in a side view of the blade at (b). When the rotor blade 2 is in a low pitch-angle position, i.e. during a low-flow operation, the axial width $L_a$ of the blade tip section $2a$ is relatively small, and the ratio of the axial width $L_T$ of the casing treatment 4 to it, i.e., $L_T/L_a$, is large. During high-flow operation, the blade is in a high pitch-angle position as shown in FIGS. 13(a) and (b). The axial width $L_a$ of the blade tip section is relatively great, and hence the $L_T/L_a$ is small.

The $L_T/L_a$ value in a measure of the influence which the treatment has upon the fan performance. The larger the $L_T/L_a$ the greater the influence and the more effectively the surge point will be extended. Conversely when the $L_T/L_a$ is small, the effect of surge point extension is little and the efficiency drop is limited. Thus, as indicated in FIG. 11, it is possible according to the invention to improve the stall characteristic towards low flow side, with little change in the characteristics on the high flow side, thereby attaining generally most advantageous performance.

Figure 14A:
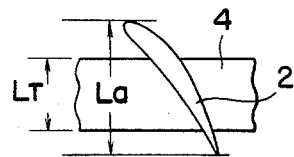
Figure 14B:
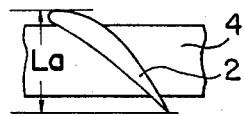
Figure 14C:
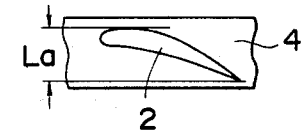

This will be better understood from the following explanation to be made with reference to FIGS. 14(a) to (c). Throughout the figures the numeral 2 designates a moving blade and 4, a casing treatment. The blade is set to an angle for delivering a large air flow (a), a designed angle (b), or to an angle for handling a small air flow (c).

As will be clear from the figures, while the axial width $L_T$ of the casing treatment 4 remains unchanged, that of the rotor blade 2, i.e., $L_a$, decreases with the reduction in air volume flow toward the lower volumetric flow rate. Accordingly, the influence of the treatment on the lower flow side increases, and this presumably brings a major improvement relative to the stall limit.

Figure 1:
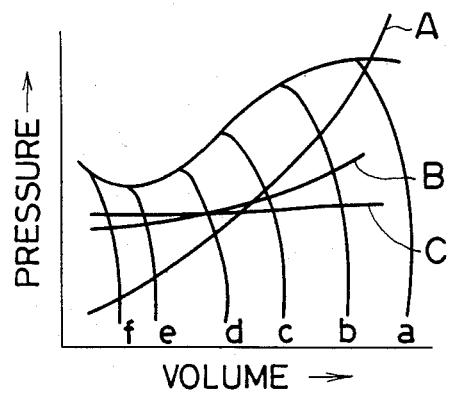
FIG. 1 is a graph showing the characteristics of a conventional axial fan of the controllable-pitch moving blade type.
Figure 2:
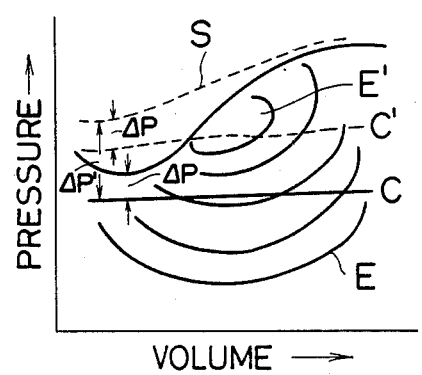
FIG. 2 is a graph comparing the characteristics of a controllable-pitch moving blade type axial fan according to the invention with those of the conventional fan.

Also, whereas the efficiency sometimes drops by 1 to 2% according to the invention, the iso-efficiency curves E as in FIG. 2 undergo little change in form (according to the results of tests conducted by the present inventors). Therefore, the rise of the operating line form C to C' means that the line approaches the eye E' (peak efficiency region) of the iso-efficiency curves E. Some loss in efficiency by the treatment is more than compensated by the change from C to C', and the overall operation efficiency is markedly improved. In addition, the fan size can be made relatively small.

The advantageous effects described above cannot be derived from any controllable-pitch moving blade type axial fan except from one having the casing treated in accordance with the invention.

These advantageous effects were confirmed by us through tests with a single-stage axial fan with 540 mm in diameter, as illustrated in FIG. 15.

In the figure: 13 is the axial centerline of the fan; 14, outer casing; 15, inner casing; 16, suction box; 17, inlet stay; 18, rotor blade; 19, impeller disk; 20, main shaft; 21, bearing; 22, outlet guide vane; 23, diffuser; and 24, casing treatment.

Using this axial fan, the varied casing treatments similar to those illustrated in FIGS. 4 through 10 were tested as the member 24.

FIG. 16 carries the characteristic curves, in which full lines represent the test results with solid wall casings and the broken lines represent those with the best type of treatment.

The graph clearly indicates that the treatment according to the invention causes but a little decline of the peak efficiency region, a negligible change in the pattern of the iso-efficiency curves, and a remarkable improvement in the surge line at low flow delivery.

Thus, according to the present invention, an axial fan of the controllable-pitch moving blade type is provided which solves the problems of the prior art fans and permits the operating conditions that require high pressures in the low volume range to be secured efficiently and safely. The fan of the invention is extremely useful, e.g., as a primary air fan for coal-fired boilers.

What is claimed is:

1. In an axial fan of the controllable-pitch moving blade type for providing an air flow ranging from a large air flow to a small air flow, comprising a fan rotor hub rotatable about an axis, a plurality of movable blades extending radially outwardly from said hub, and each having a radially outer end and a variable setting angle inclined relatiive to said rotor hub axis, a controllable-pitch mechanism mounted in said hub for changing the setting angle of said blades during operation, each of said blades having a tip at the radially outer end thereof more remote from said hub with the tips of said blades traveling in a tip circle, an imperforate axially extending casing laterally enclosing said blades and including a wall having an inner wall surface spaced closely outwardly from the tips of said blades and said wall extending radially outwardly from said inner surface, wherein the improvement comprises an annular circumferentially extending recess formed in said inner wall surface with the base of the recess spaced radially outwardly from said inner wall surface and located within said wall, said recess aligned opposite and closely outwardly from said tip circle, a casing treatment located in said recess and extending radially outwardly from said inner wall surface of said casing into said recess and extending annularly around the circumference of said recess, said casing treatment having a radially inner surface generally flush with said inner wall surface of said casing, said casing treatment extending in the axial direction of said hub for at least a portion of the axial dimension of said blades and the axial extent of said casing treatment remains constant while the axial extent of the tips of said blades vary in accordance with the air flow with the axial extent determined by said controllable-pitch mechanism and the axial extent of the tips of said blades ranging from an axial dimension greater than the axial extent of said casing for the larger air flow to an axial dimension less than the axial extent of said casing for the small air flow, whereby said casing treatment affords operating conditions providing high pressure in the low volume range and also permitting improvement of the stall characteristics toward the low flow side.

2. An axial fan of the controllable-pitch moving blade type as claimed in claim 1, which comprises said casing treatment being formed by a face plate having a radially inner surface generally flush with said inner wall surface of said casing, a number of perforations extending through said flat plate and opening into said recess.

3. An axial fan of the controllable-pitch moving blade type, as claimed in claim 1, which comprises said casing treatment being formed by a honeycomb cell structure forming a number of honeycomb-like perforations extending radially outwardly from said inner wall surface.

4. An axial fan of the controllable-pitch moving blade type, as claimed in claim 1, which comprises said casing treatment being formed by a plurality of laterally spaced circumferentially extending wall members located in said recess and forming a number of grooves in said inner wall surface extending in the circumferential direction.

5. An axial fan of the controllable-pitch moving blade type, as claimed in claim 1, which comprises said casing treatment being formed by a plurality of laterally spaced axially extending wall members located in said recess and forming a number of grooves said inner wall surface extending in the axial direction.

6. An axial fan of the controllable-pitch moving blade type, as claimed in claim 1, which comprises said casing treatment being formed by a plurality of laterally spaced wall members located in said recess and extending at an inclination to the axis of said casing and forming a number of grooves in said inner wall surface with said grooves extending in the direction opposite to the inclination of the setting angle of said blades.

7. An axial fan of the controllable-pitch moving blade type, as claimed in claim 1, which comprises said casing treatment being formed by a plurality of laterally spaced wall members located in said recess and extending at an inclination to the axis of said casing and forming a number of grooves in said inner wall surface with said grooves extending in the same direction as the inclination of the setting angle of said blades.

8. An axial fan of the controllable-pitch moving blade type, as claimed in claims 2, 3, 4, 5, 6 or 7, which comprises that said casing forming an axially extending air passage, at least one duct located on the exterior of said casing and disposed in communication with the base of said recess and with said air passage at a location spaced one of upstream and downstream of said recess.

* * * * *